Sept. 28, 1971    J. W. HARFORD    3,608,163
APPARATUS FOR PRODUCTION OF PRE-STRESSED
MOLDED CONCRETE MEMBERS
Filed July 7, 1969    6 Sheets-Sheet 1
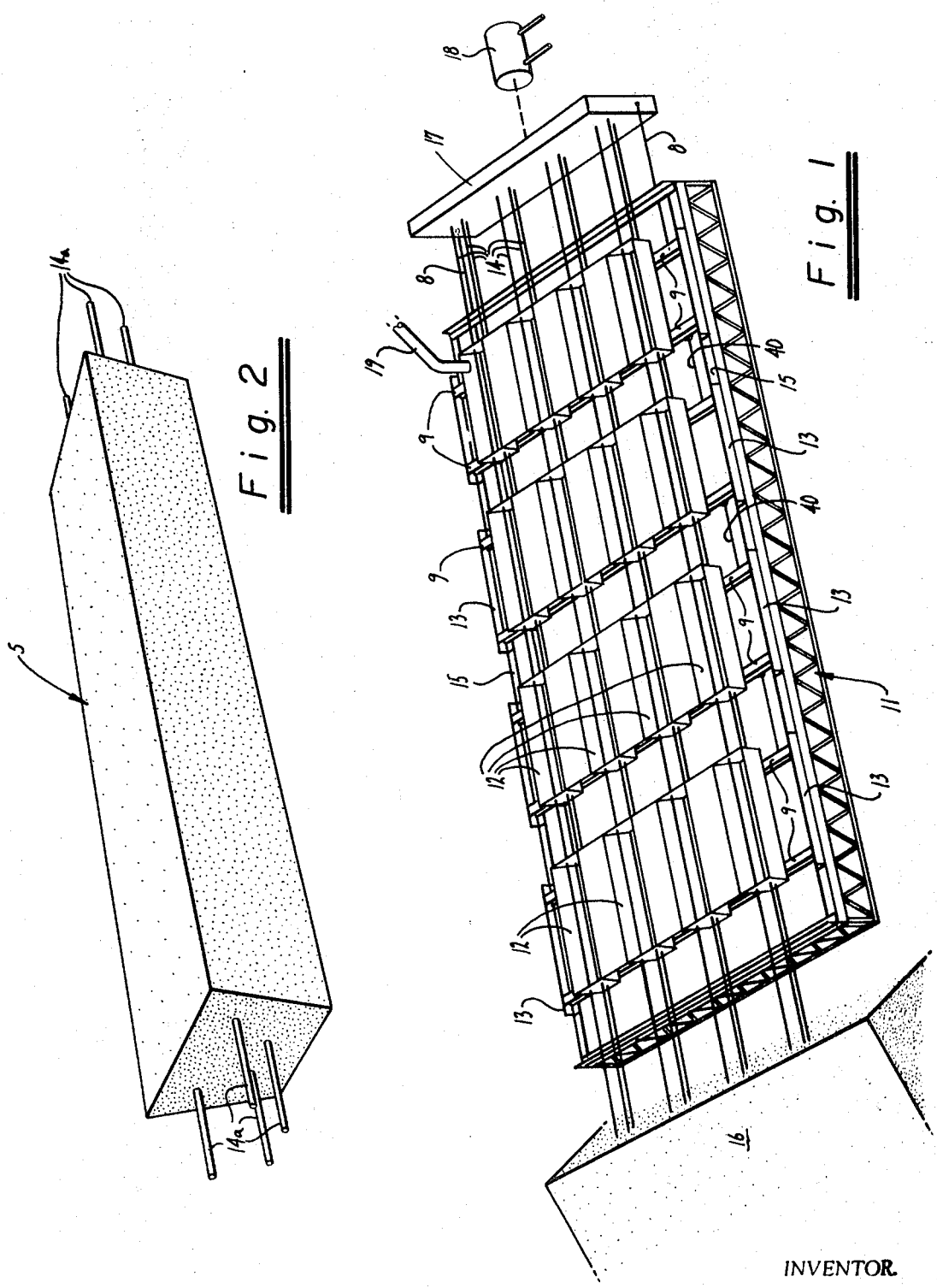
INVENTOR.
Jon W. Harford
BY Flehr, Hohbach, Test
Albritton & Herbert
Attorneys INVENTOR.
Jon W. Harford INVENTOR.
Jon W. Harford Sept. 28, 1971  J. W. HARFORD  3,608,163
APPARATUS FOR PRODUCTION OF PRE-STRESSED
MOLDED CONCRETE MEMBERS
Filed July 7, 1969  6 Sheets-Sheet 4
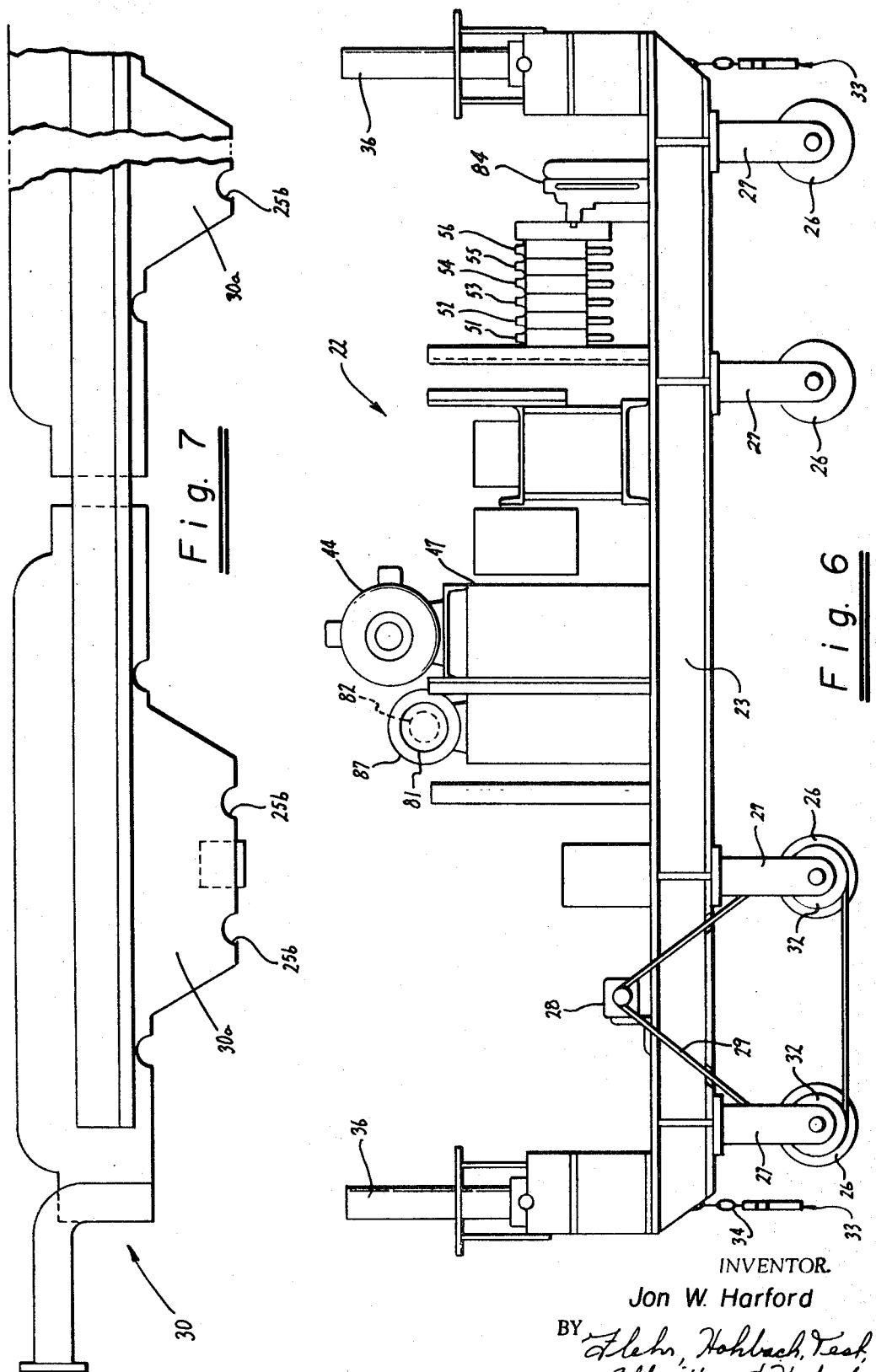
INVENTOR.
Jon W. Harford

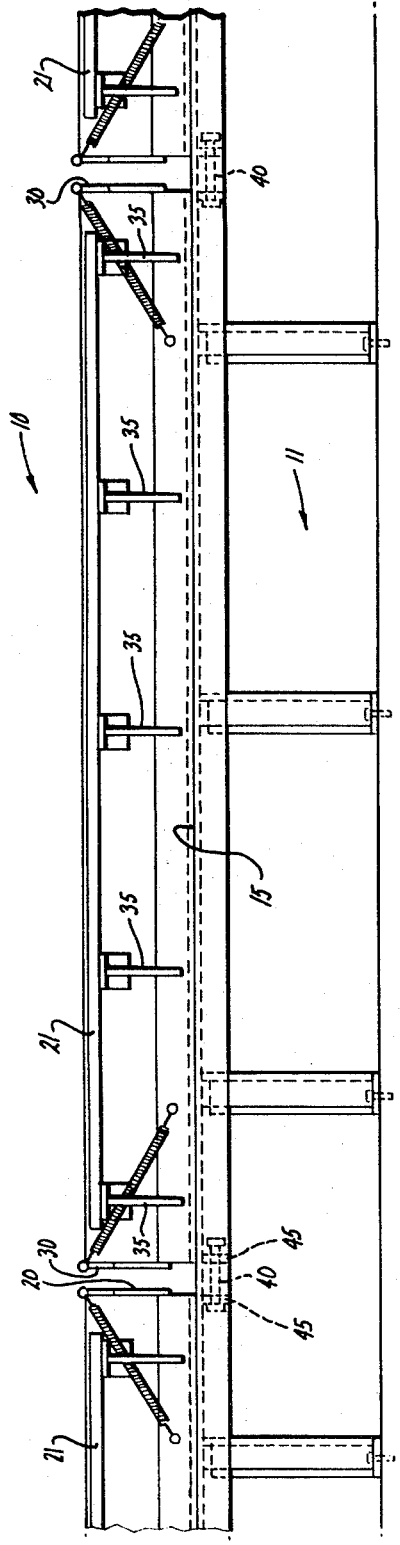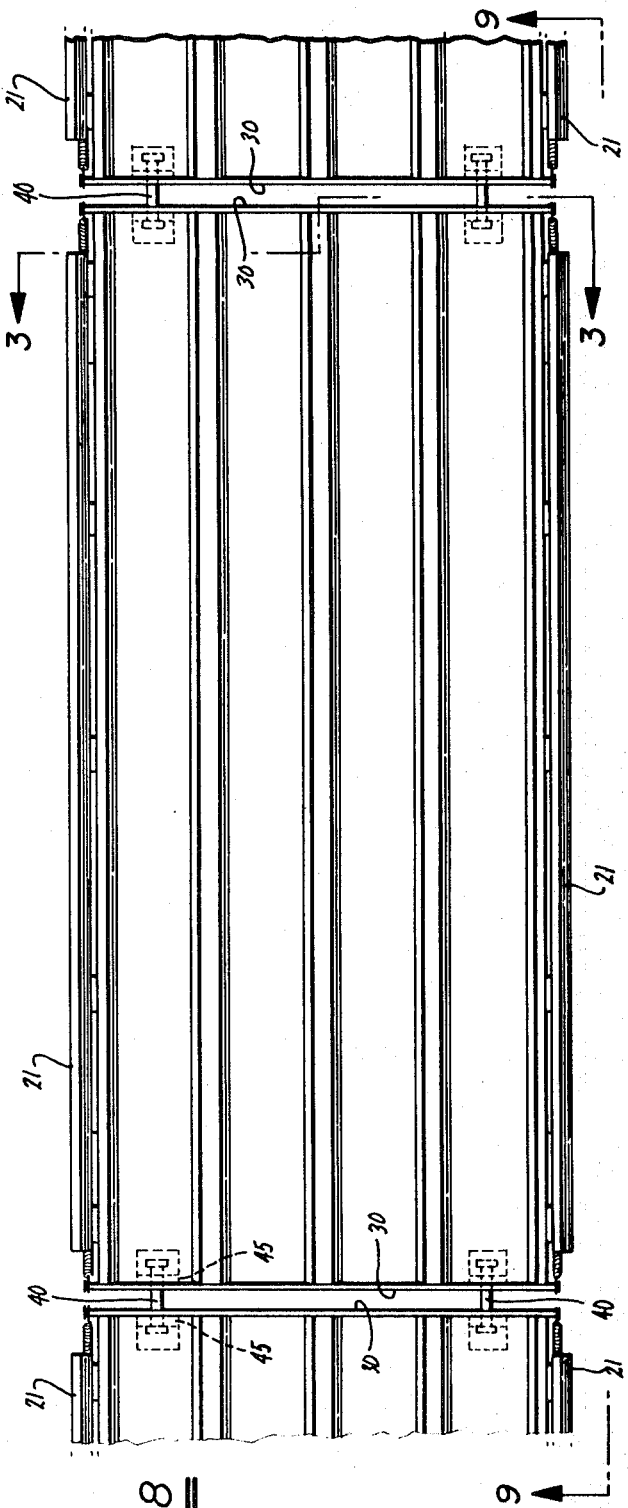

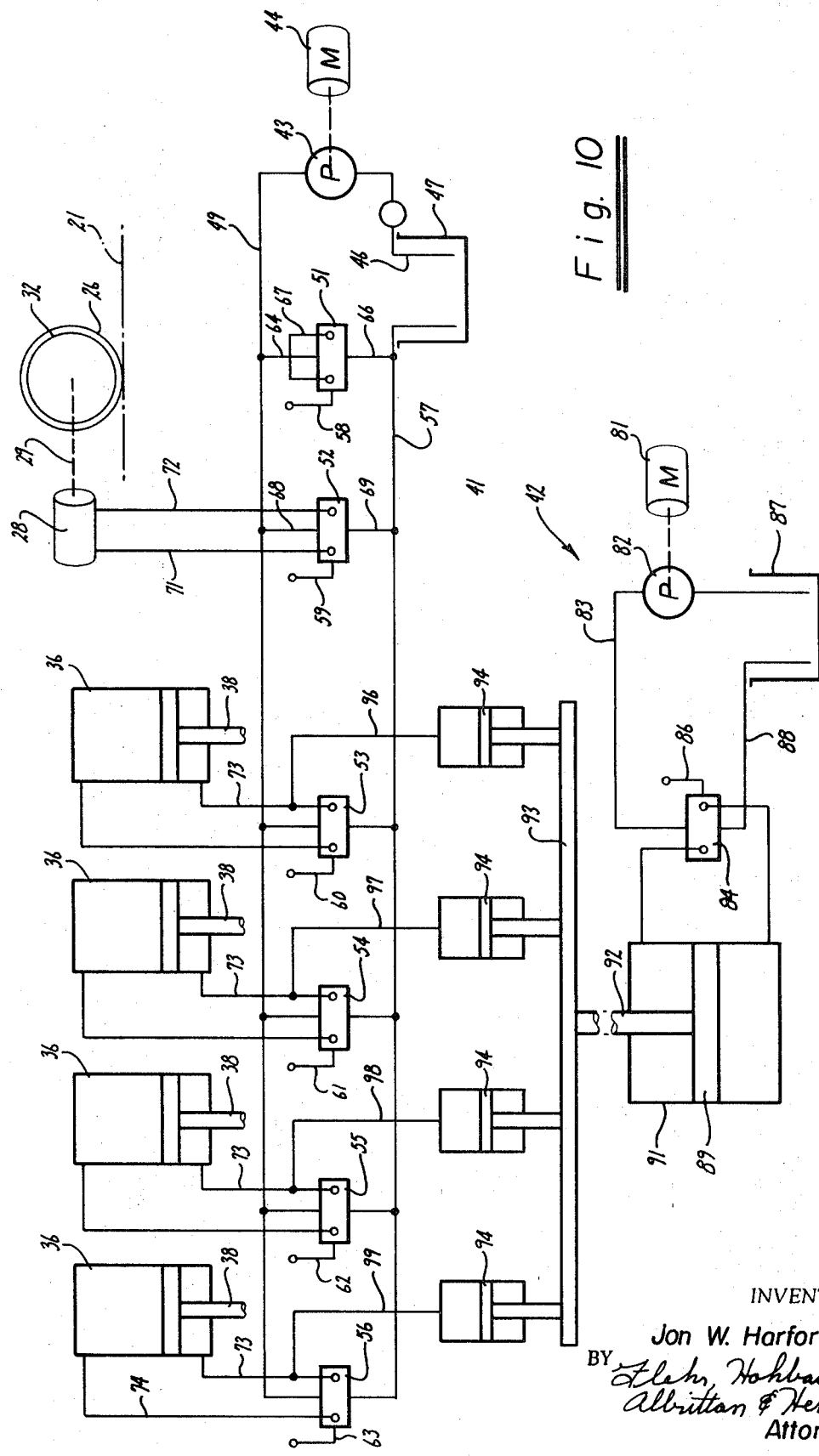

United States Patent Office 3,608,163
Patented Sept. 28, 1971

3,608,163
APPARATUS FOR PRODUCTION OF PRE-STRESSED MOLDED CONCRETE MEMBERS
Jon W. Harford, Petaluma, Calif., assignor to J. H. Pomeroy & Co., Inc., San Francisco, Calif.
Filed July 7, 1969, Ser. No. 840,140
Int. Cl. B28b *13/06*
U.S. Cl. 25—120                                         4 Claims

ABSTRACT OF THE DISCLOSURE

In the manufacture of pre-stressed molded concrete members a lifting machine characterized by a laterally extending rigid bar at each end which can be lowered into engagement with the projecting stubs of the cable ends extending out of the molded member. The means for elevating these two transversely extending rigid bars serves first to eliminate all slack from the hoisting means coupled to the bars. Thereafter, the bars are elevated evenly so as not to introduce a twisting moment to the molds or members.

BACKGROUND OF THE INVENTION

This invention pertains to a system for manufacture of pre-stressed molded concrete members which is characterized by the method of molding and handling the concrete members as well as the machine disclosed herein for manipulating the members within the context of the method disclosed.

Various methods have previously been disclosed for the manufacture of pre-cast and pre-stressed concrete members wherein one or more elongated pre-tensioned cables is disposed in the concrete prior to hardening of the concrete. It has been observed that in a number of systems heretofore employed, the mold forms are shuffled about and moved while containing wet concrete, i.e., before the concrete has had an opportunity to become fully cured. Thus, there has heretofore been known certain systems of the type described for providing continuous manufacture of molded pre-stressed concrete members. Each of these systems is believed to have suffered from certain disadvantages derived from the overall system organization and, as will be pointed out further below, the present system as disclosed herein is believed to employ certain advantages of its own.

SUMMARY AND OBJECTS OF THE INVENTION

In general, a system for making elongated pre-stressed concrete members formed in an array of columns and rows of mold forms has been provided characterized by a machine for removing the cured members from their respective mold forms in a manner serving to protect the mold forms against damage as well as the concrete members themselves.

Heretofore, after the tension has been relieved from the pre-stressing cable extending through a concrete member, some difficulty has been experienced in attempting to remove the formed member from its mold. This has been attributed to the fact that the release of the cables extending through the cured members serves to transfer the cable's tension to the concrete product. This causes a certain minimal shrinkage of the concrete product, causing some binding action developed by this slight elastic shortening of the member as a result of the transferral of the pre-stress forces to the member.

As disclosed herein, a machine has been disclosed wherein the cured concrete members may be withdrawn from their respective molds under uniformly applied forces.

The machine travels on rails extending along the sides of a tandem series of multiple mold form assemblies while laterally spanning the mold form assembly. The method of manufacturing the pre-stressed molded concrete members comprises the steps of disposing the mold forms in columns and rows in a substantially horizontal plane. Then tensioning cables are disposed to extend lengthwise through the mold forms of each column. Subsequently, tension is applied to all of the cables simultaneously from a common drawbar and thereafter the forms are filled with a hardenable cementitious material such as concrete. After permitting the material to harden within its related mold, the tension on the cables is released simultaneously and slowly whereby the mold assemblies move relative to each other in the direction of their length. Subsequently, the cables are severed between the tandemly adjacent mold forms so as to provide cable stub portions projecting from the opposite ends of each mold form. Thereafter, the stub portions are engaged by the machine and all of a plurality of laterally disposed members are simultaneously lifted and removed from their forms.

It is a general object of the present invention to provide an improved system for manufacture of molded pre-stressed concrete products.

It is another object of the invention to provide an improved method of the manufacture of pre-stressed concrete products.

Still a further object of the invention is to provide an improved machine for simultaneously lifting a number of pre-stressed concrete products from their respective mold forms.

These and other objects of the present invention will be more readily apparent from the following detailed description of a preferred embodiment according to the invention.

BRIEF DESCRIPTION OF THE DRAWING

FIG. 1 is a perspective view showing a system according to the invention;

FIG. 2 is an enlarged detail view showing a molded concrete member of a type produced in a system according to FIG. 1;

FIG. 6 is shown as a side elevation view of one side of a mold stripping machine according to the invention;

FIG. 7 is an enlarged detail view of an end gate portion of the apparatus according to the invention;

FIGS. 8 and 9 are respectively plan and side elevation views of multiple mold assemblies disposed upon a support bed; and FIG. 10 shows a schematic hydraulic diagram for control of a mold stripping machine.

DESCRIPTION OF THE PREFERRED EMBODIMENT

Figure 3:
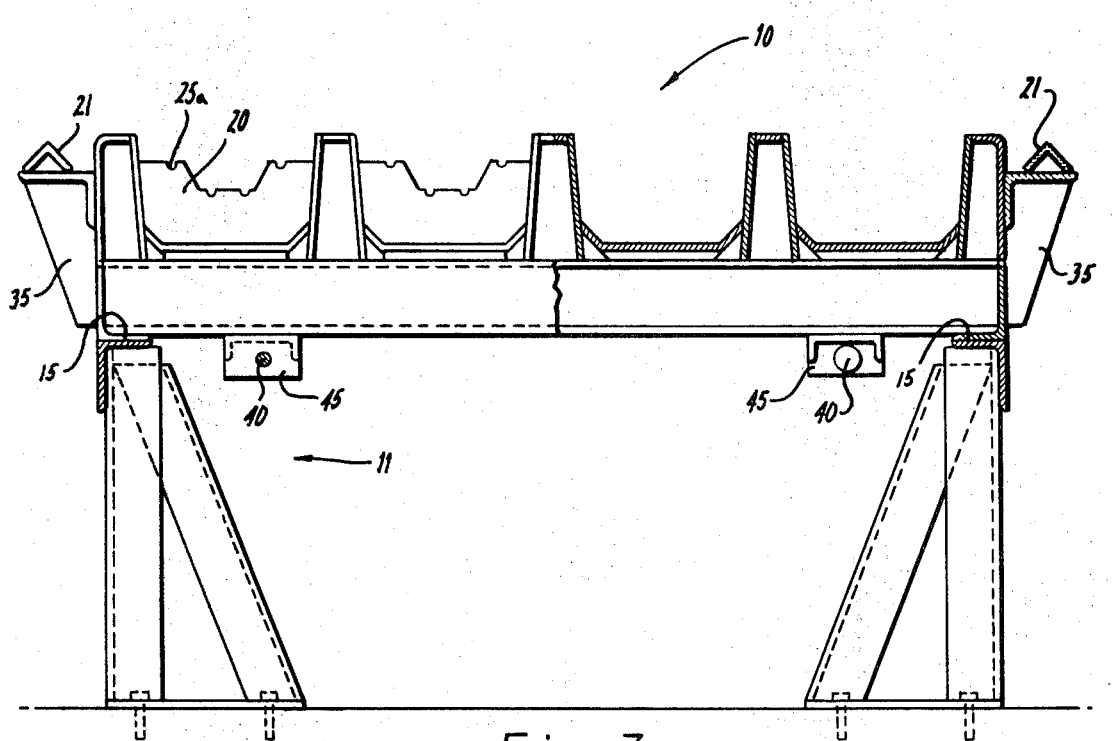
FIG. 3 is an end elevation partial section view taken along the section line 3—3 of FIG. 8.
Figure 4:
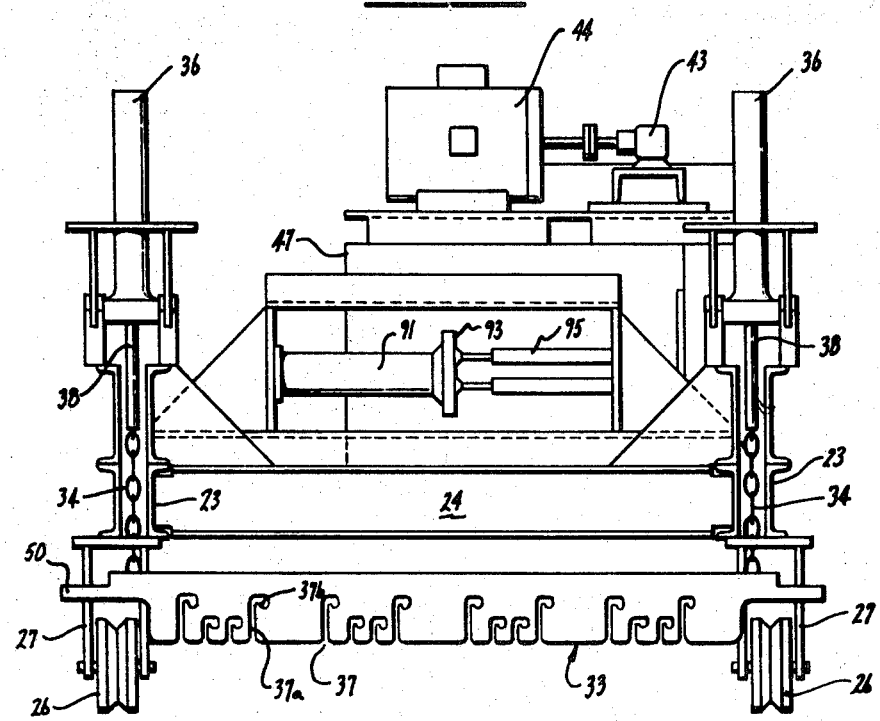
FIG. 4 is an end elevation view of a mold stripping machine according to the invention as viewed from the right hand end of FIG. 6.
Figure 5:
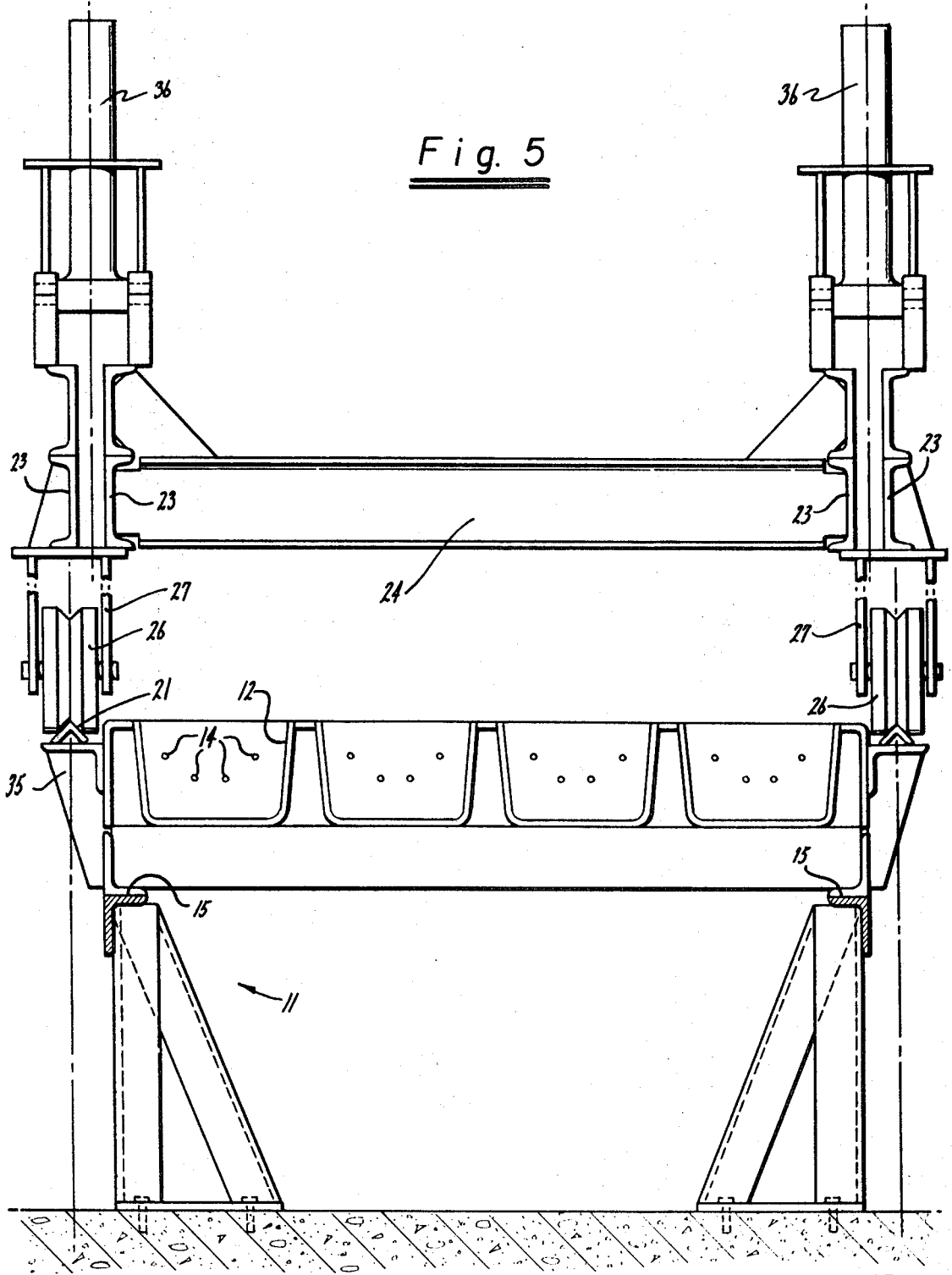
FIG. 5 is an end elevation view of a travelling frame portion of a mold stripping machine disposed above a plurality of laterally arranged mold forms.

In general, with reference to FIG. 1, there is schematically shown in perspective view of a diagrammatic representation of a system for forming pre-stressed molded concrete products. In general, there is provided a rigid, stationary bed assembly 11 arranged in generally rectilinear style utilizing cross-bracing to impart rigidity to the frame.

The bed assembly 11 supports a number of tandemly disposed multiple mold form assemblies 10, each of which is arranged to slide along ways 15 to provide limited relative movement between tandemly adjacent assemblies 10.

Each assembly 10 further is constructed as a unit to include a plurality of laterally disposed mold forms 12. The ends of each form are closed by means of a pair of end gate sections consisting of a lower section 20 provided with semi-circular slots 25a to receive tensioning cables 14 therein and upper end gate sections 30a formed as a depending portion of a removable upper end gate assembly 30. Each of sections 30a is formed with semi-circular slots 25b which mate with slots 25a to form openings 25 through which cables 14 may pass lengthwise through each mold form 12.

Each mold assembly 10 further carries inverted V-shaped guide rails 21 along each side thereof by means of the triangularly-shaped support brackets 35.

As noted above, each assembly 10 is movable along skids 15 to a limited degree for purposes described further below. Thus, elongated bolts 40 interconnect in sliding relation between brackets 45 depending beneath the end of each assembly 10 whereby the assemblies 10 can be first drawn apart to a limited extent and then serve to draw the next tandemly adjacent assembly 10 with it, as by connection 8.

This sequence serves to fully extend a column of assemblies 10 so as to provide spacing between them which can contract upon release of tension in the cables 14.

The mold forms 12 are thus arranged in columns whereby a number of them are disposed in tandem spaced relationship to extend along the length of bed assembly 11.

As shown in FIG. 1, the cables 14 are anchored by conventional means (not shown) in the concrete anchor base 16 shown at the left hand side of FIG. 1. The other ends of cables 14 are also anchored by conventional means (not shown) in a drawbar 17 common to all of the cables 14. Thus, suitable means schematically represented by the ram 18 serves to apply tension simultaneously and evenly to all of the cables 14.

After ram 18 and drawbar 17 have sufficiently tensioned the cables 14, a hardenable cementitious material such as concrete is then filled into each of the mold forms utilizing conventional means such as a mobile cement truck having an elongated dispensing spout schematically indicated at 19.

Subsequent to filling each of the mold forms 12, the concrete material is permitted to harden and this can be accomplished more expeditiously by covering the entire array of mold forms with canvas and then discharging steam beneath the canvas utilizing steam lines with a number of vents formed therealong.

After the concrete has hardened, ram 18 is slowly released so as to relieve the tension in all of the cables 14 simultaneously using the common cross-head drawbar 17. At this time, the tandemly arranged assemblies 10 will move slidably in the direction of the length so as to diminish the spacing between the tandemly adjacent ends of each adjacent pair of forms 12. In this manner, the tension previously supplied to cables 14 by ram 18 is transferred into the concrete of the molded members. Furthermore, it will be readily apparent that the cable portions located between tandemly adjacent pairs of forms 12 will no longer be under tension and then can be readily cut or severed.

Having transferred the tension to the concrete members within mold forms 12, some limited elastic shortening of the members results and has been observed to create a certain amount of binding action which makes more difficult the removal of the members from their molds.

Accordingly, means have been provided as now to be described for readily removing the cured molded pre-stressed concrete members from their mold forms 12.

Mold stripping machine 22 rides on rails 21 and includes a travelling frame comprised of the longitudinally extending side members 23 and transversely extending end members 24. A number of support wheels 26, formed with a V-shaped groove in the tread portion of the wheel, are journalled at the lower end of a number of downwardly extending supports 27.

As thus arranged, wheels 26 are closely guided by the inverted V-shaped guide rails 21 for supporting the travelling frame to move along and above a number of laterally adjacent mold assemblies 10.

Means for advancing the machine 22 along rails 21 includes the hydraulic motor 28 coupled to a chain drive 29 trained about a pair of pulleys 32 fixed to the side of two of the wheels 26. A chain guard 31 normally covers chain drive 29 for general safety purposes.

As noted above, after severing the cable portions located intermediate the tandemly adjacent ends of a pair of mold forms 12, there will remain a stub portion 14a (FIG. 2) of the pre-stressing cable 14 protruding from the end of the hardened concrete member.

Machine 22 serves to remove a plurality of molded concrete members from their respective mold forms simultaneously by engaging these stub portions in the manner now to be described.

It will be observed that the frame members 23 substantially correspond to the length of mold form 12. At each end of the frame, a rigid movable means has been provided for engaging the protruding stub portions of cable material extending from the ends of the concrete members lying in the mold forms. Thus, a rigid movable lifting bar 33 extends transversely of the direction of movement of machine 22 at each end thereof. Bars 33 are supported by extensible lifting means such as the chains 34 connected at their lower ends to bar 33 and at their upper ends to a piston rod 38 of a hydraulic piston operated within the hydraulic cylinders 36.

In order to properly engage the protruding cable stubs, the lower edge of bars 33 includes spaced, open entry channels 37 disposed and adapted to receive the stub portions 14a. Each of channels 37 further includes an upwardly extending portion 37a merging into a laterally extending locking portion 37b so as to permit the bar 33 to receive all of the protruding stub portions of a plurality of the concrete members formed within molds 12.

The ends of each bar 33 are formed with manual handle-grips 50 whereby workmen on each end of the bar can manipulate the bar into engagement with stubs 14a.

It will be readily evident that the disposition of the laterally extending locking portions 37b is arranged to coincide with the disposition of the cable stubs 14a disposed within the concrete member 5 (see FIG. 2) being formed within molds 12. Thus, the bar 33 can be lowered to receive all stub portions of a plurality of the concrete members 5 and then be shifted laterally relative to the entry channel portion 37a to dispose a bar portion 33a beneath a stub portion located in the channel 37 whereby the bar portion 33a can act from beneath the cable stub portion and lift it upwardly.

The remainder of the apparatus carried by the travelling frame of machine 22 has been numbered in the drawings to correspond to the schematic hydraulic diagram shown in FIG. 10 where the function and operation of this equipment can better be described relative to the overall operation of the machine.

Briefly, two hydraulic systems 41, 42 are mechanically tied together whereby one system 41 can serve to operate the cylinders 36 for quickly raising and lowering the extensible chains 34 connected to their respective piston rods 38. System 41 is also employed to pre-tension each of the chains 34 whereby, upon initiating the raising of both bars 33, all four support points defined by the connection of the chain ends will be lifted simultaneously the same amount with substantially equal forces. In this manner, there will be minimized any tendency to twist or otherwise deform the lifting plane defined between the two bars 33.

The second power system 42 cooperates with the first power system 41 for uniformly applying forces to all four of the chains 34 during the crucial "break-out" release of the molded members 5 from their forms 12. Thus, system 42 can drive the pistons of system 41.

The first power system 41 for operating piston rods 38 between advanced and retracted positions within cylinders 36 includes a pump 43 driven by an electric motor 44. Pump 43 takes suction via line 46 from a reservoir 47 and filters the input to pump 43 through the filter 48.

The discharge side of pump 43 serves to provide a hydraulic supply under pressure via line 49 to any one of a number of control valves 51 through 56. Valves 51 through 56 are connected between supply line 49 and a return line 57 which discharges back into the reservoir 47. Valves 51 through 56 are of conventional construction such as, for example, the conventional stacked valve wherein a number of movable elements are employed together as is well known.

Each of valves 51 through 56 includes an operating element 58 through 63 respectively which is movable in order to establish any one of several conditions. In the case of valve 51, its control element 58 can be operated so as to establish a fluid path along the input line 64 to the output line 66 but via a restrictive jumper line 67. In this manner, line 67 can be employed to function as a pressure limiting element of the system whereby the system pressure in the power system 41 will be restricted to a relatively low level.

Valve 52 serves to couple the input line 68 to the output line 69 via the two leads 71, 72 which serve to drive the hydraulic motor 28 for advancing the stripping machine 22 along its path by rotation of pulley 32. Thus, control lever 59 serves to control the advancing movement of the machine 22. Valves 53 through 56 are each arranged whereby in a neutral condition, their input leads from supply line 49 are connected to the return line 57 and in addition supply line 49 is further coupled to feed fluid into that side of cylinder 36 connected to line 73.

In another position of operation of the control elements 60 through 63 for valves 53 through 56, fluid supply pressure from line 49 is coupled to discharge into the cylinders 36 via input line 73 while the cylinder discharge line 74 is coupled to the return line 57. A third positioning of the control element 63, for example, with respect to valve 56, serves to reverse the functioning just reviewed, namely that line 73 is coupled to return line 57 while the line 74 is coupled to supply line 49. In this manner, it is possible to operate all of the valves 60 through 63 to move the pistons within cylinders 36 in either of two directions.

The second power system 42 employed in applying a uniform "breaking-out" force evenly to each of the four support points of bars 33 comprises an electric driven motor 81 for operating a hydraulic pump 82 for circulating a hydraulic supply along line 83, through a suitable valve 84 operated in the manner above described by means of a control element 86 and then returns the fluid flow to a reservoir 87 via the return line 88.

Valve 84 serves to couple the hydraulic supply of line 83 to operate piston 89 within cylinder 91. The piston rod 92 from piston 89 is coupled directly to a rigid bar 93 for simultaneously positioning the pistons 94 (in cylinders 95) conjointly therewith. As pistons 94 are moved upwardly relative to their cylinders 95, fluid is discharged therefrom via lines 96 through 99 respectively. The upper ends of lines 96–99 are coupled directly into lines 73 for purposes now to be described.

In operation, valve 51 is actuated so as to limit the pressure available to cylinders 36. The pistons of cylinders 36 are then retracted simultaneously by operating their respective control levers 60 through 63 whereby a relatively low hydraulic pressure is applied to each of four chains 34. At this point, the slack has then been taken out of each of the four chains so that the two bars 33 at the opposite ends of machine 22 are ready to hoist the concrete molded members 5 out of their mold forms 12 a slight amount, for example, on the order of one-half inch.

This is accomplished by operating valve 84 so as to force piston rod 92 and piston 89 upwardly. This action serves to substantially evenly apply fluid pressure via lines 96 through 99 to the input cylinder lines 73 associated with each of the cylinders 36 whereby each piston therein will be retracted. Thus, the pistons will be retracted at the same rate furnishing substantially equal quantities of fluid to the cylinders 36 at a high pressure, for example, on the order of 1000 p.s.i. for an upward movement on the order of one-half inch.

Subsequently, all of valves 53 through 56 will be actuated to retract cylinders 36 at a greater rate for the full height of their throw under the supply of fluid pressure from pump 43 and supply 49. This is done in order to raise all of the concrete members well clear of their forms so that, for example, dunnage or other supporting material can be interposed between the underside of the molded members and the tops of the forms. This could, for example, permit the use of a fork lift to interpose its tines therebetween and lift four of the molded members at a time for placement in storage. In order to lower the two lifting bars 33, it is possible to operate valves 53 through 56 in a manner whereby piston rods 38 may be lowered slightly.

Having completed the above operation, the entire mold-stripping machine 22 is then advanced to the next group of mold forms to be stripped. Accordingly, valve 52 is operated for purposes of driving the wheels 26 associated with pulleys 32 via the hydraulic motor 28. During this time, valve 84 can be actuated so as to retract piston 89 to its withdrawn position whereby retracting all of pistons 94.

It is to be noted that during application of the high pressure bread-out, forces supplied by piston 89 causes the discharge of high pressure fluid along lines 96 through 99 into their associated lines 73. No back circuit will be formed through lines 73 to the return line 57 since in the neutral condition of each of valves 53 through 56, this return path is blocked by the valve structure as is known relative to the stacked type of valve.

From the foregoing, it will be readily evident that there is provided an improved system for the manufacture of pre-stressed concrete members in mold forms. The method has, of course, the advantage that wet concrete is not required to be carried in the mold forms from one station to another and the tensioning of the cables employed in the pre-stressed elements becomes substantially simplified.

The machine for stripping pre-stressed concrete members from their mold forms further serves to ensure against warping or twisting of the plane of the several pre-stressed members being lifted out of their forms simultaneously whereby a higher rate of removal can be achieved without danger of damage to the forms or to the members themselves.

The weight of the stripping machine riding on the rails 21 carried by assemblies 10 serves to hold the forms 12 against movement during stripping.

I claim:

1. In a system for making elongated pre-stressed concrete members formed in an array of columns and rows of mold forms, apparatus for removing the members from their respective forms comprising means forming a travelling frame adapted to travel along and above a plurality of the columns, the length of the frame substantially corresponding to the length of a mold form, rigid movable means at each end of the frame for engaging longitudinally projecting stub portions of material extending from the ends of said members lying in said forms, extensible lifting means coupled to said rigid means at each end of the frame, first power means coupled to said extensible lifting means for tightening said lifting means to remove slack therefrom, and second power means coupled to said extensible lifting means for simultaneously hoisting said rigid means and said members.

2. In a system according to claim 1, said rigid movable means further comprising an elongated, rigid bar extending transversely of said columns, the lower edge of said bar including spaced, open entry channels therein disposed and adapted to receive said stub portions, each of said channels further including an upwardly extending portion merging into a laterally extending locking portion to permit said bar to receive all said stub portions of a plurality of said members and to be shifted laterally, relative to the entry channel to dispose a bar portion in lifting position beneath a stub portion located in said channel.

3. In a system according to claim 1 wherein said first and second power means comprise first and second hydraulic systems, said first system including a plurality of hydraulically operated hoisting pistons coupled to said extensible lifting means, and means mechanically coupling said second system to the first for boosting and evenly distributing the hydraulic forces among said plurality of hoisting pistons in the first system.

4. In a system for forming pre-cast concrete sleepers, a first and second column of tandemly spaced mold boxes, said columns lying in side by side relation, means supporting said mold boxes and permitting relative movement therebetween in the direction of their length, elongated tensioning cables disposed to extend lengthwise through the mold boxes of each column and in common to the boxes thereof, means forming a travelling frame movable along and above said columns and spanning both said first and second columns, elongated rigid engagement means extending transversely across said columns at each end of said frame to be lowered into engagement with longitudinally projecting stub portions of said sleepers, extensible means carrying the ends of said engagement means to move between lowered and raised positions, first power means coupled to said extensible means for tightening same evenly at the opposite ends of said engagement means at each end of said frame, and second power means coupled to drive said first power means for simultaneously hoisting said rigid means and said members.

References Cited

UNITED STATES PATENTS

| | | | |
|---|---|---|---|
| 2,394,228 | 2/1946 | Barber et al. | 25—118TX |
| 2,745,164 | 5/1956 | Ros | 25—118T |
| 2,966,717 | 1/1961 | Fuller | 25—118TX |
| 3,217,375 | 11/1965 | Kinnard | 25—2X |
| 3,233,027 | 2/1966 | Wennstrom | 25—118TX |
| 3,305,907 | 2/1967 | Baker | 25—2 |

J. SPENCER OVERHOLSER, Primary Examiner

B. D. TOBOR, Assistant Examiner

U.S. Cl. X.R.

25—2, 118T